(12) United States Patent
Mitsuda et al.

(10) Patent No.: US 6,956,798 B2
(45) Date of Patent: Oct. 18, 2005

(54) INFORMATION RECORDING APPARATUS AND METHOD FOR RECORDING INFORMATION ON RECORDING MEDIUM

(75) Inventors: Makoto Mitsuda, Ibaraki (JP); Eiji Yamauchi, Hirakata (JP); Shinichiro Uno, Kawasaki (JP)

(73) Assignees: Matsushita Electric Industrial Co., Ltd., Osaka (JP); Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 10/413,901

(22) Filed: Apr. 14, 2003

(65) Prior Publication Data

US 2003/0193859 A1 Oct. 16, 2003

(30) Foreign Application Priority Data

Apr. 16, 2002 (JP) .............................. 2002-113865

(51) Int. Cl.$^7$ ................................................ G11B 7/00
(52) U.S. Cl. ............... 369/47.13; 369/53.2; 369/53.22; 369/53.37; 369/59.25
(58) Field of Search ........................... 369/47.13, 53.2, 369/53.22, 53.37, 59.25, 47.1

(56) References Cited

U.S. PATENT DOCUMENTS 6,243,338 B1 * 6/2001 Mine ........................ 369/47.1
6,466,532 B1 * 10/2002 Ko ............................ 369/53.2
6,856,585 B2 * 2/2005 Stan et al. ................ 369/47.13

FOREIGN PATENT DOCUMENTS

JP 6-19808 1/1994

* cited by examiner

Primary Examiner—William Korzuch
Assistant Examiner—Van Pham
(74) Attorney, Agent, or Firm—Hamre, Schumann, Mueller & Larson, P.C.

(57) ABSTRACT

An operation of a recording/reproducing portion is controlled by a control portion so as to record data in a predetermined recording region on a recording medium, and perform update recording in the predetermined recording region in accordance with occurrence of update information of the data. The control portion further has a function of controlling the recording/reproducing portion so as to record an update portion of data in a temporary storage region in a part of the recording medium and record an update flag showing whether the predetermined recording region has been updated with the update portion or has not been updated with the update portion in an update flag region, and in update recording with respect to the predetermined recording medium, successively performs operations of recording the update portion in the temporary storage region, setting the update flag in a non-updated state, recording the update portion in the predetermined recording region, and setting the update flag in an updated state.

8 Claims, 4 Drawing Sheets

INFORMATION RECORDING APPARATUS AND METHOD FOR RECORDING INFORMATION ON RECORDING MEDIUM

BACKGROUND OF THE INVENTION

1. Field of the Invention

The present invention relates to an information recording apparatus for writing data on a recording medium such as an optical recording medium, a magneto-optical recording medium or a magnetic recording medium, and a method for recording information on the recording medium.

2. Description of the Related Art

In recording information on a recordable/reproducible recording medium such as an optical recording medium, a magneto-optical recording medium or a magnetic recording medium, a main data region and a management data region generally are set in a recording region. In the main data region, main data is recorded, such as computer data and a video signal that are main recording subjects. In the management data region, management data is recorded, which is composed of management information such as a file allocation table (FAT) related to recording in the main data region. An information recording apparatus using such a recording medium is configured so as to perform update recording in the management data region when adding main data to the main data region.

In the case where there is update information with respect to the recorded contents, regarding data to be recorded in a predetermined recording region, update recording is performed in the predetermined recording region, regarding an update portion. At this time, when recording fails due to the disconnection of a power source before completion of update recording, data in the predetermined recording region remains in an incorrect state, which causes problems during reproduction of information.

JP 06(1994)-19808 A describes a method for solving a problem similar to the above in an information processing apparatus. According to this method, flags for data file saving and saving management are placed in a non-volatile memory, so that a data file can be restored from a memory even when recording is not terminated normally.

However, the apparatus disclosed in JP 06(1994)-19808 A has the following problems. That is, every time data is rewritten in a recording medium, data also should be rewritten in a non-volatile memory for data backup. Accordingly, the non-volatile memory is degraded every time data is rewritten, which causes a problem in reliability of the non-volatile memory. The use of a volatile memory for overcoming this problem is considered; however, another power source such as a battery is required.

Furthermore, in the case where a recording medium is exchanged, backup data on a memory is not matched with the recording on a removed recording medium due to the subsequent use history. Furthermore, irrespective of a volatile memory or a non-volatile memory, to provide a memory for protection increases the cost of a recording apparatus.

SUMMARY OF THE INVENTION

Therefore, with the foregoing in mind, it is an object of the present invention to provide an information recording apparatus capable of protecting management data and the like exactly without using a special memory.

An information recording apparatus of the present invention includes: a recording/reproducing portion for recording and reproducing data with respect to a recording medium; and a control portion for controlling an operation of the recording/reproducing portion, the control portion controlling the recording/reproducing portion in accordance with the occurrence of an update portion of data, so that the update portion is recorded to update a predetermined recording region on the recording medium. The control portion further has a function of controlling the recording/reproducing portion so as to record the update portion of the data in a temporary storage region provided in a part of the recording medium and record an update flag showing whether the predetermined recording region has been updated with the update portion or has not been updated with the update portion in an update flag region provided in a part of the recording medium, and in update recording with respect to the predetermined recording region, successively performs operations of recording the update portion of the data in the temporary storage region, setting the update flag in an non-updated state, recording the update portion of the data in the predetermined recording region, and setting the update flag in an updated state.

An information recording apparatus with another configuration of the present invention includes: a recording/reproducing portion for recording and reproducing data with respect to a recording medium; and a control portion for controlling an operation of the recording/reproducing portion. The control portion controls the recording/reproducing portion so as to record main data that is a main recording subject in a main data region of the recording medium, simultaneously record management data for managing recording of the main data in a management data region of the recording medium, and in accordance with occurrence of an update portion of the management data involved in recording in the main data region, record the update portion to update the management data region. The control portion further has a function of controlling the recording/reproducing portion so as to record the update portion of the management data in a temporary storage region provided in a part of the recording medium and record an update flag showing whether the management data region has been updated with the update portion or has not been updated with the update portion in an update flag region provided in a part of the recording medium, and in update recording with respect to the management data region, successively performs operations of recording the update portion of the management data in the temporary storage region, setting the update flag in a non-updated state, recording the update portion of the management data in the management data region, and setting the update flag in an updated state.

According to the above configuration, a protection region for recording contents is provided as a temporary storage region, whereby management data can be protected exactly even without a memory.

In the above-mentioned configuration, preferably, the control portion has a function of checking the update flag at power-on or when the recording medium is loaded, and in a case where the update flag has been updated, retaining a normal recordable state, and in a case where the update flag has not been updated, recording the update portion of the predetermined data or the management data recorded in the temporary storage region in the predetermined data region or the management data region to set the update flag in an updated state and setting a normal recordable state.

A method for recording information on a recording medium of the present invention includes operations of recording data in a predetermined recording region on a recording medium, and recording an update portion to update the predetermined recording region in accordance with occurrence of the update portion of the predetermined data, and has the following features. That is, the recording medium includes a temporary storage region for storing the update portion of the data and an update flag region for recording an update flag showing whether the predetermined recording region has been updated with the update portion or has not been updated with the update portion. In update recording with respect to the predetermined recording region, the following operations are performed successively: the update portion is recorded in the temporary storage region, the update flag is set in a non-updated state, the update portion is recorded in the predetermined recording region, and the update flag is set in an updated state.

Another method for recording information of the present invention includes operations of recording main data that is a main recording subject in a main data region on a recording medium, recording management data for managing recording of the main data in a management data region of the recording medium, and recording an update portion to update the management data region in accordance with occurrence of the update portion of the management data involved in recording in the main data region, and has the following features. That is, the recording medium includes a temporary storage region for recording an update portion of the management data and an update flag region for recording an update flag showing whether the management data region has been updated with the update portion or has not been updated with the update portion. In update recording with respect to the management data region, the following operations are performed successively: the update portion of the management data is recorded in the temporary storage region, the update flag is set in a non-updated state, the update portion of the management data is recorded in the management data region, and the update flag is set in an updated state.

In the above-mentioned method, preferably, the update flag is checked at power-on or when the recording medium is loaded, and in a case where the update flag has been updated, a normal recordable state is retained, and in a case where the update flag has not been updated, the update portion of the predetermined data recorded in the temporary storage region is recorded in the predetermined data region to set the update flag in an updated state and a normal recordable state is set.

These and other advantages of the present invention will become apparent to those skilled in the art upon reading and understanding the following detailed description with reference to the accompanying figures.

DESCRIPTION OF THE PREFERRED EMBODIMENTS

Embodiment 1

Hereinafter, an information recording apparatus and a method for recording information on a recording medium according to Embodiment 1 of the present invention will be described with reference to FIGS. 1 to 3.

Figure 1:
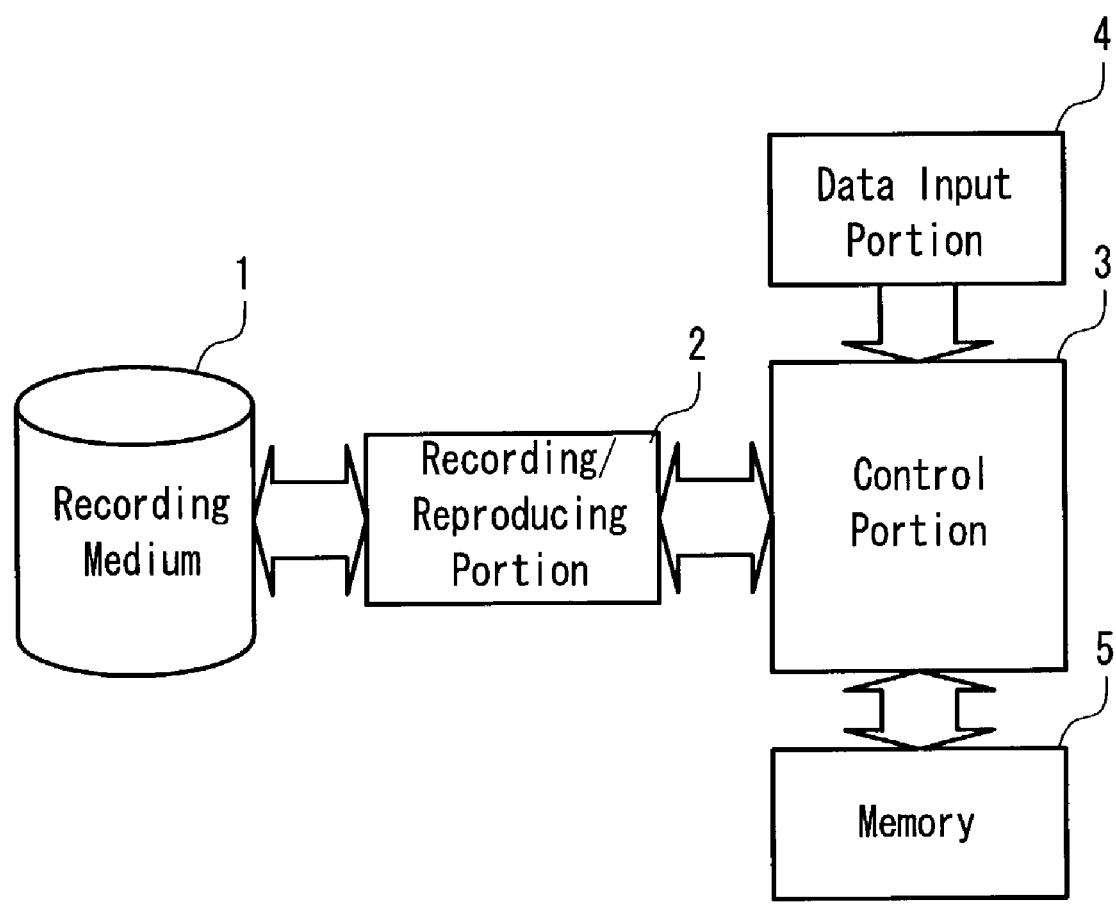
FIG. 1 is a block diagram showing an information recording apparatus according to Embodiment 1 of the present invention.

FIG. 1 shows a configuration of an information recording apparatus. Reference numeral 1 denotes a recording medium. As the recording medium 1, a recordable/reproducible medium such as an optical recording medium, a magneto-optical recording medium, a magnetic recording medium, or the like is used. A recording/reproducing portion 2 includes a head and the like for recording/reproducing data with respect to the recording medium 1, and its operation is controlled by a control portion 3. Main data that is to be recorded and stored in the recording medium 1 is supplied from a data input portion 4 to the control portion 3. The main data is recorded on the recording medium 1 via the recording/reproducing portion 2 under the control of the control portion 3. A memory 5 is used for provisional storage in a recording operation.

Figure 2:
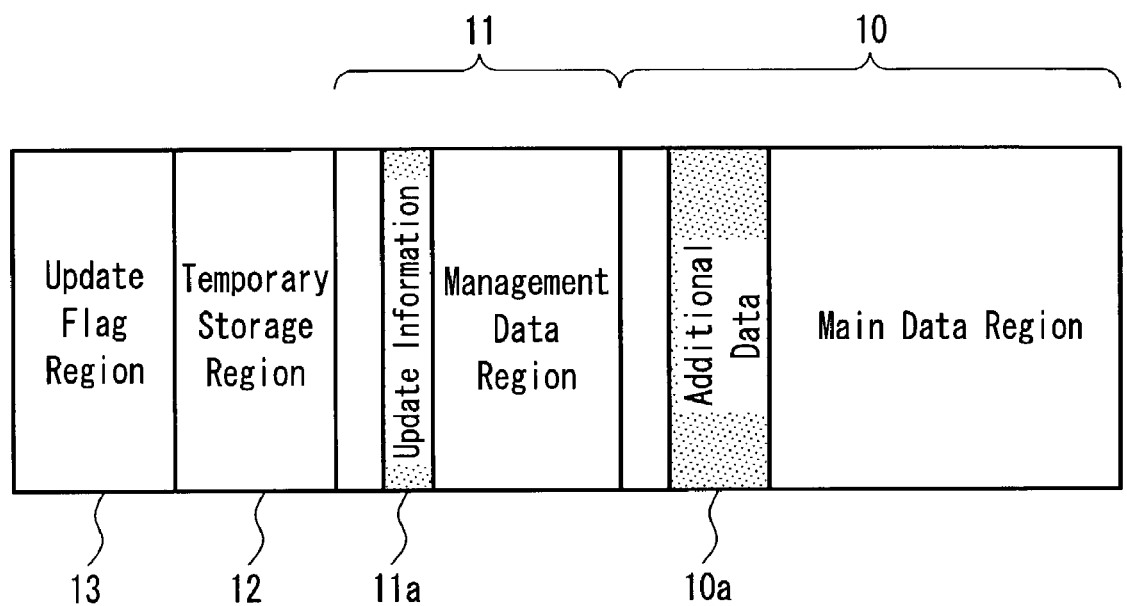
FIG. 2 is a view showing recorded contents in a recording medium to be recorded by the apparatus in FIG. 1.

FIG. 2 shows the contents recorded in the recording medium 1. Reference numeral 10 denotes a main data region, and 11 denotes a management data region. In the main data region 10, main data are recorded, such as computer data and a video signal that are main recording subjects. In the management data region 11, management data such as a FAT, a UDF, and the like related to the recorded contents in the main data region 10 are recorded. Additional data 10a refers to an additional portion in the case where data is added to the main data region 10. Update information 11a refers to a portion where recording of the management data region 11 is updated with the update information generated along with the recording of the additional data 10a.

In a part of the recording medium on which recording is performed according to the present embodiment, a temporary storage region 12 and an update flag region 13 are provided in addition to the above-mentioned regions. In the temporary storage region 12, the same data as that of the update information 11a generated along with the recording of the additional data 10a is stored temporarily. The update flag region 13 is provided so as to correspond to the temporary storage region 12, and an update flag is recorded, which shows whether or not the management data region 11 has been updated with the update information 11a.

The control portion 3 shown in FIG. 1 controls, during recording of main data, a flow of recording by the recording/reproducing portion 2 in the main data region 10, the management data region 11, the temporary storage region 12, and the update flag region 13. More specifically, the following operations are performed successively: recording data supplied from the data input portion 4 in the main data region 10 as the additional data 10a; creating update information composed of an update portion of the management data to record it in the temporary storage region 12; setting the update flag of the update flag region 13 in a non-updated state; recording the update information 11a in the management data region 11; and setting the update flag of the update flag region 13 in an updated state.

Figure 3:
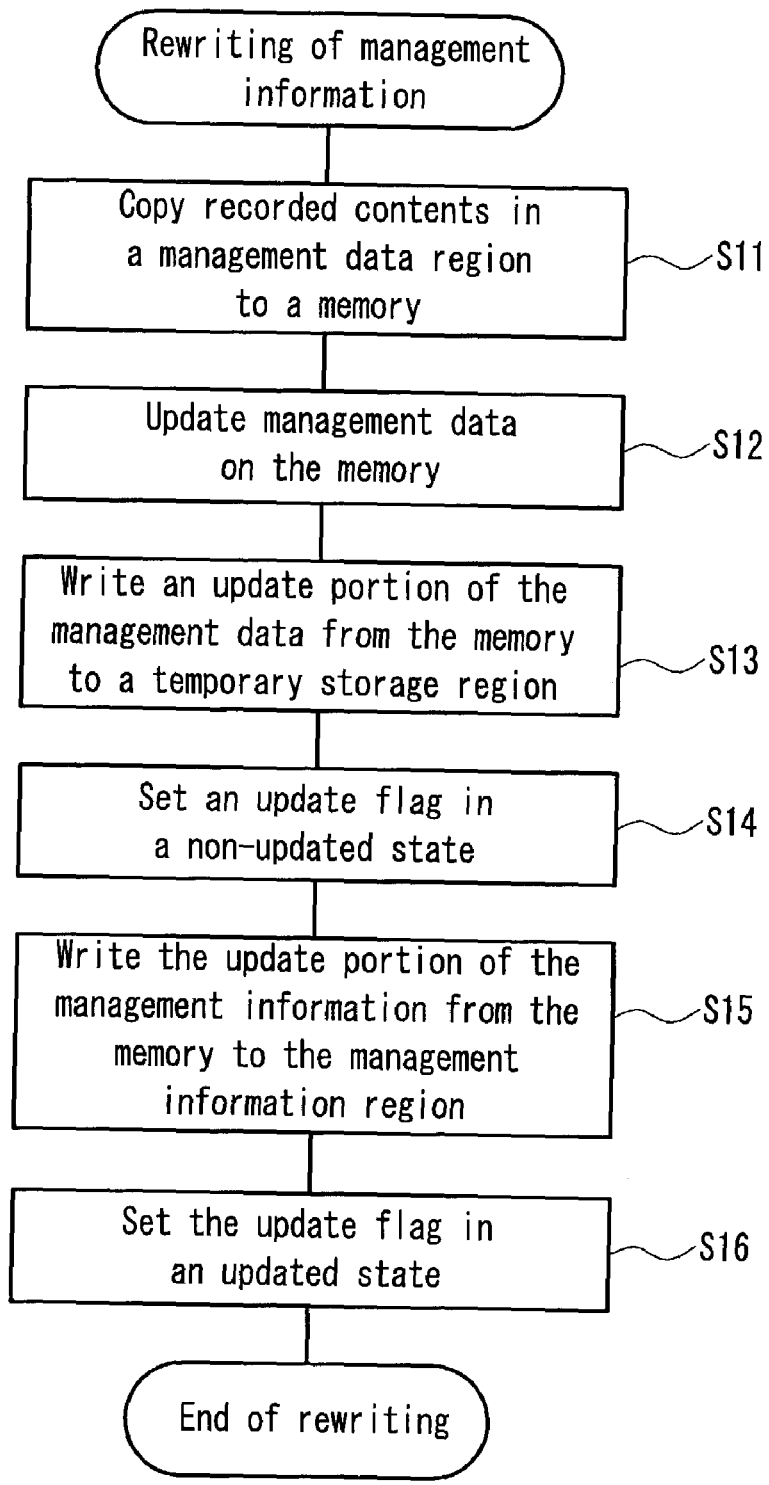
FIG. 3 is a flow chart illustrating a recording operation of the information recording apparatus according to Embodiment 1 of the present invention.

FIG. 3 is a flow chart illustrating main portions regarding a more specific operation of the information recording apparatus in the present embodiment. This flow chart does not illustrate the entire recording operation, but illustrates only the operation regarding rewriting of the management data in the management data region 11 (i.e., recording of the update information 11a) that is a feature of the present embodiment.

Rewriting of the management data occurs along with the recording the additional data 10a. The control portion 3 first copies the management data from the management data region 11 of the recording medium 1 to the memory 5 (Step S11). Then, the control portion 3 analyzes the contents of the management data, determines a region for writing the additional data 10a in the main data region 10, and adds the additional data 10a to the main data region 10. Together with this, the management data on the memory 5 is updated (Step S12). Apart (update portion) of the management data to be updated at this time corresponds to the update information 11a, and the other part of the management data is not changed.

Next, the update portion of the management data on the memory 5 is written in the temporary storage region 12 (Step S13). Thus, the update information 11a is not written back to the management data region 11 immediately.

Furthermore, the update flag of the update flag region 13 corresponding to the temporary storage region 12 is set in a non-updated state (Step S14).

Next, the update information 11a is written back from the memory 5 to the management data region 11 (Step S15). At this time, the data to be written back is the same as the update information stored in the temporary storage region 12.

Furthermore, the update flag of the update flag region 13 is changed from a non-updated state to an updated state (Step S16).

Because of the above-mentioned operation, the recording of the additional data 10a, and the updating of the management data region involved in the recording (i.e., recording of the update information 11a) are completed.

According to the above configuration, the temporary storage region 12 is provided on the recording medium 1, and the update information 11a is set as a protection region. Therefore, management data can be protected exactly without providing a non-volatile memory separately.

The above-mentioned configuration, in which the temporary storage region 12 and the update flag region 13 are provided so as to manage updating of data, also is applicable to cases other than the case where the main data region 10 and the management data region 11 are provided. More specifically, even in the case where only the main data region 10 for recording data is provided and the management data region 11 is not involved on a recording medium, the concept of the present embodiment is effective. In this case, an update portion of data to be recorded (corresponding to the additional data 10a) is recorded in the main data region 10, and the update portion is recorded in the temporary storage region 12 in the same way as in the update information 11a of the management data region 11. As a result, the temporary storage region 12 can be set as a protection region of the update portion of data.

Embodiment 2

The basic configuration of the information recording apparatus according to Embodiment 2 is the same as that shown in FIG. 1. In the same way as in FIG. 2, the contents to be recorded on a recording medium are composed of a main data region 10, a management data region 11, a temporary storage region 12, and an update flag region 13. The difference between Embodiments 1 and 2 lies in the function of the control portion 3. The control portion 3 in Embodiment 2 has a function of performing operations as shown in FIG. 4, in addition to the operations shown in FIG. 3.

Figure 4:
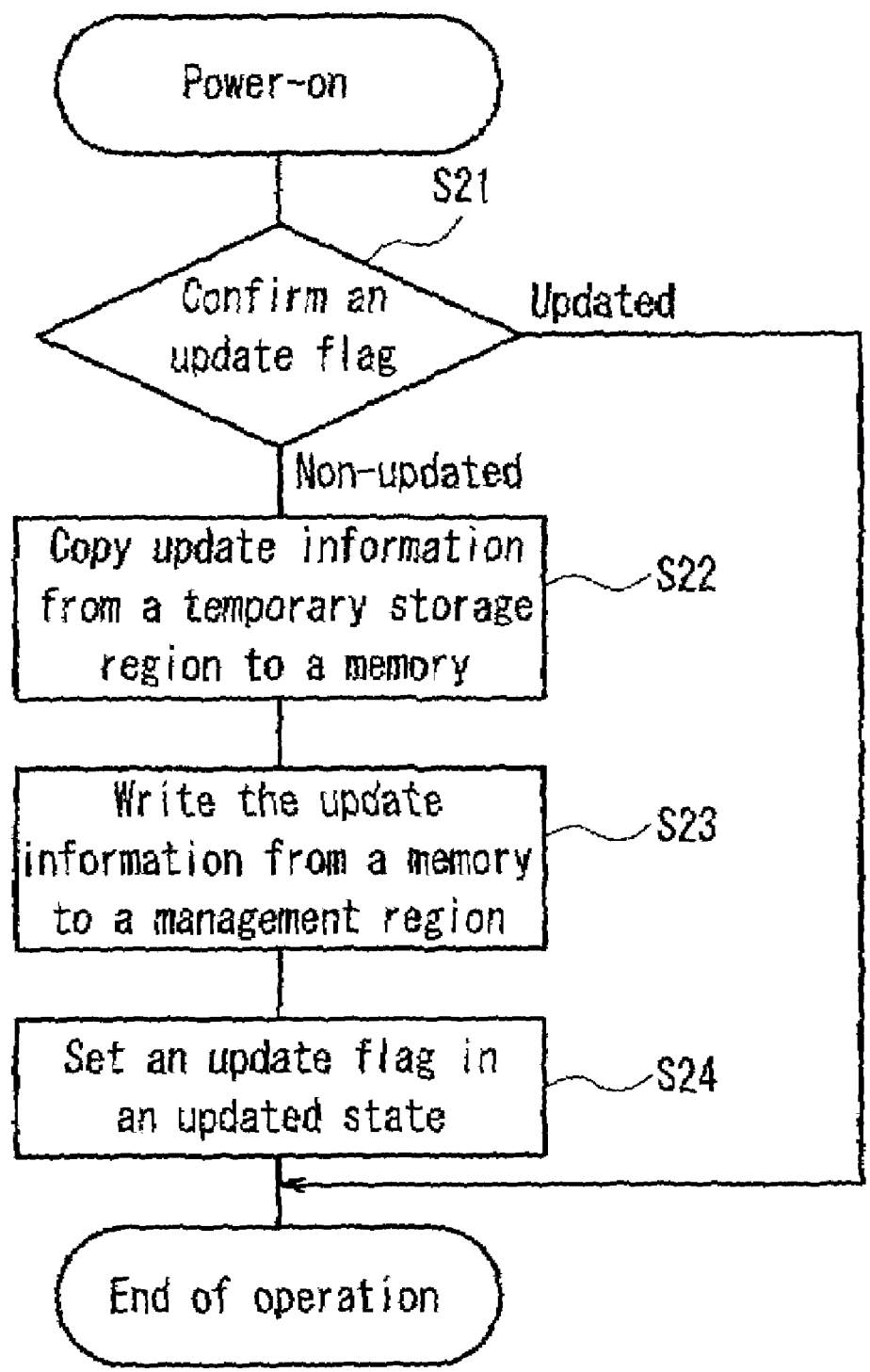
FIG. 4 is a flow chart illustrating a recording operation of an information recording apparatus according to Embodiment 2 of the present invention.

FIG. 4 is a flow chart illustrating operations at power-on. Addition of data at a normal time is performed by the operations shown in Embodiment 1. However, the operations may be interrupted for some reason, such as disconnection of a power source, midway through the operation procedure. The flow chart in FIG. 4 shows an operation at power-on, which can handle the case in the presence of such a history.

At power-on, the control portion 3 first reads the update flag region 13 of the recording medium 1 to confirm the update flag (Step S21). At this time, if the update flag of the update flag region 13 has been updated, the previous writing is considered to have been terminated normally. Thus, the management data recorded in the management data region 11 is normal, and the power-on operation is terminated, so that the subsequent normal recording operation can be performed.

On the other hand, if the update flag of the update flag region 13 has not been updated, the previous writing is not considered to have been terminated normally. Thus, the update information 11a has not been recorded normally in the management date region 11. In this case, the update information 11a is copied from the temporary storage region 12 to the memory 5 (Step S22).

Next, in the same way as in Embodiment 1, the update information 11a is written back from the memory 5 to the management date region 11 (Step S23).

Furthermore, the update flag of the update flag region 13 is changed from a non-updated state to an updated state (Step S24).

Because of the above operation, the updating of the management data that has been terminated midway through a task is completed. Therefore, the power-on operation is terminated, and the subsequent normal recording operation can be performed.

The present disclosure is applicable even in a configuration in which the recording medium 1 is loaded in a non-exchangeable manner or in a configuration in which the recording medium 1 is loaded in an exchangeable manner. In the case where the recording medium 1 is exchangeable, the present invention is more effective. More specifically, in the configuration in which the recording medium 1 is exchangeable, the operation of Embodiment 2 is performed not only when a power source is turned on again, but also when a recording medium to be exchanged is inserted, whereby the identity of the recorded contents can be maintained.

As described above, according to the present disclosure, a protection region for recording contents is provided on a recording medium. Therefore, management data can be protected exactly even without a memory. Furthermore, since a memory for protection is not provided, the cost of an apparatus can be decreased. Furthermore, even in an apparatus having a configuration in which a recording medium is exchangeable, it is not required to consider the inconsistency between the backup data and the recorded contents on the recording medium.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information recording apparatus comprising: a recording/reproducing portion for recording and reproducing data with respect to a recording medium; and a control portion for controlling an operation of the recording/reproducing portion, the control portion controlling the recording/reproducing portion, in accordance with occurrence of an update portion of data, so that the update portion is recorded to update a predetermined recording region on the recording medium, wherein the control portion has a function of controlling the recording/reproducing portion so as to record the update portion of the data in a temporary storage region provided in a part of the recording medium and record an update flag showing whether the predetermined recording region has been updated with the update portion or has not been updated with the update portion in an update flag region provided in a part of the recording medium, and in update recording with respect to the predetermined recording region, successively performs operations of recording the update portion of the data in the temporary storage region, setting the update flag in an non-updated state, recording the update portion of the data in the predetermined recording region, and setting the update flag in an updated state.

2. An information recording apparatus according to claim 1, wherein the control portion has a function of checking the update flag at power-on or when the recording medium is loaded, and in a case where the update flag has been updated, retaining a normal recordable state, and in a case where the update flag has not been updated, recording the update portion of the predetermined data recorded in the temporary storage region in the predetermined data region to set the update flag in an updated state and setting a normal recordable state.

3. An information recording apparatus comprising: a recording/reproducing portion for recording and reproducing data with respect to a recording medium; and a control portion for controlling an operation of the recording/reproducing portion, the control portion being configured to control the recording/reproducing portion so as to record main data that is a main recording subject in a main data region of the recording medium, simultaneously record management data for managing recording of the main data in a management data region of the recording medium, and in accordance with occurrence of an update portion of the management data involved in recording in the main data region, record the update portion to update the management data region, wherein the control portion has a function of controlling the recording/reproducing portion so as to record the update portion of the management data in a temporary storage region provided in a part of the recording medium and record an update flag showing whether the management data region has been updated with the update portion or has not been updated with the update portion in an update flag region provided in a part of the recording medium, and in update recording with respect to the management data region, successively performs operations of recording the update portion of the management data in the temporary storage region, setting the update flag in a non-updated state, recording the update portion of the management data in the management data region, and setting the update flag in an updated state.

4. An information recording apparatus according to claim 3, wherein the control portion has a function of checking the update flag at power-on or when the recording medium is loaded, and in a case where the update flag has been updated, retaining a normal recordable state, and in a case where the update flag has not been updated, recording the update portion of the management data recorded in the temporary storage region in the management data region to set the update flag in an updated state and setting a normal recordable state.

5. A method for recording information including operations of recording data in a predetermined recording region on a recording medium, and recording an update portion to update the predetermined recording region in accordance with occurrence of the update portion of the data, wherein the recording medium includes a temporary storage region for storing the update portion of the data and an update flag region for recording an update flag showing whether the predetermined recording region has been updated with the update portion or has not been updated with the update portion, and in update recording with respect to the predetermined recording region, the following operations are performed successively: the update portion is recorded in the temporary storage region, the update flag is set in a non-updated state, the update portion is recorded in the predetermined recording region, and the update flag is set in an updated state.

6. A method for recording information on a recording medium according to claim 5, wherein the update flag is checked at power-on or when the recording medium is loaded, and in a case where the update flag has been updated, a normal recordable state is retained, and in a case where the update flag has not been updated, the update portion of the predetermined data recorded in the temporary storage region is recorded in the predetermined data region to set the update flag in an updated state and a normal recordable state is set.

7. A method for recording information including operations of recording main data that is a main recording subject in a main data region on a recording medium, recording management data for managing recording of the main data in a management data region of the recording medium, and recording an update portion to update the management data region in accordance with occurrence of the update portion of the management data involved in recording in the main data region, wherein the recording medium includes a temporary storage region for recording an update portion of the management data and an update flag region for recording an update flag showing whether the management data region has been updated with the update portion or has not been updated with the update portion, and in update recording with respect to the management data region, the following operations are performed successively: the update portion of the management data is recorded in the temporary storage region, the update flag is set in a non-updated state, the update portion of the management data is recorded in the management data region, and the update flag is set in an updated state.

8. A method for recording information on a recording medium according to claim 7, wherein the update flag is checked at power-on or when the recording medium is loaded, and in a case where the update flag has been updated, a normal recordable state is retained, and in a case where the update flag has not been updated, the update portion of the management data recorded in the temporary storage region is recorded in the management data to set the update flag in an updated state and a normal recordable state is set.

* * * * *